United States Patent [19]
Jones et al.

[11] Patent Number: 5,261,218
[45] Date of Patent: Nov. 16, 1993

[54] POWERED RAKE HAVING DEBRIS WINDROWING MECHANISM

[75] Inventors: Randall S. Jones; Eric Johnson; R. Nathan Massey, all of Salina, Kans.

[73] Assignee: Great Plains Manufacturing Incorporated, Great Plains, Kans.

[21] Appl. No.: 967,250

[22] Filed: Oct. 27, 1992

Related U.S. Application Data

[63] Continuation-in-part of Ser. No. 800,986, Dec. 2, 1991.

[51] Int. Cl.$^5$ ............................................. A01D 76/00
[52] U.S. Cl. ........................................................ 56/366
[58] Field of Search ................................. 56/365–369, 56/376–377, 381

[56] References Cited

U.S. PATENT DOCUMENTS

| | | |
|---|---|---|
| 2,938,586 | 5/1960 | Gaffney . |
| 2,971,587 | 2/1961 | Anderson . |
| 3,117,631 | 1/1964 | Fahrenholz . |
| 3,739,855 | 6/1973 | Bliss . |
| 3,923,101 | 12/1975 | Donohue . |
| 3,993,141 | 11/1976 | Donohue . |
| 4,315,546 | 2/1982 | Fahrenholz . |
| 4,440,235 | 7/1984 | Colistro . |
| 4,496,003 | 1/1985 | Bynum . |
| 4,555,897 | 12/1985 | Degelman . |
| 4,785,614 | 11/1988 | Schoenherr ............ 56/366 X |

OTHER PUBLICATIONS

Harley Landscape Power Rakes, brochure, undated, Blenmac, Jamestown, N.D.
Harley Rock Rakes & Pickers, brochure, undated, Glenmac, Jamestown, N.D.
Ag-Tech's Preseeder Gives You Super Seedbeds—Fast & Easy! undated flyer, ATI Corporation, New Holland, Pa.

*Primary Examiner*—Thuy M. Bui
*Attorney, Agent, or Firm*—Hovey, Williams, Timmons & Collins

[57] ABSTRACT

A powered rake for windrowing debris for subsequent collection is provided which includes a main frame for coupling to a tractor, a subframe mounted for pivotal movement relative to the main frame about an upright pivot axis, a roller pivotal with the subframe to an oblique angle relative to the direction of travel, and a material control member including a blade extending along the length of the roller and presenting a gap therebetween. The subframe is preferably pivotal for presenting the roller at an oblique angle to the right or left with respect to the intended direction of travel, thereby permitting the powered rake hereof to continuously windrow the debris in the path of the roller. The roller is rotatably mounted on a pair of downwardly and forwardly extending legs which present substantially open areas outboard of the roller to permit debris to pass freely outboard into a windrow without any obstruction from the frame or subframe supporting the roller. The roller preferably presents a plurality of circumferentially spaced, radially projecting splines which are spiral oriented around the longitudinal axis of the roller to present an even load on the roller as it rotates in engagement with the soil.

25 Claims, 6 Drawing Sheets

POWERED RAKE HAVING DEBRIS WINDROWING MECHANISM

This is a Continuation of application Ser. No. 07/800,986 filed Dec. 2, 1991.

BACKGROUND OF THE INVENTION

1. Field of the Invention

This invention relates to a ground engaging implement for separating rocks, trash, limbs and other debris from the soil and windrowing the debris for subsequent collection. More particularly, the windrowing mechanism hereof utilizes a rotatable roller which is preferably selectively adjustable to an obliquely angled position to the right or left for moving the debris to either side of the rake for windrowing.

2. Description of the Prior Art

Whether the property be a farmer's field, a construction site to be planted, or a public beach, a problem which is frequently encountered is the presence of large foreign objects on the property which must be removed before the property may be beneficially used. In the case of a farmer's field, numerous stones, large and small, may be close to the surface of the soil and prevent satisfactory planting and harvesting of a crop. At a construction site, the presence of boards, stones, wallboard and other debris may prevent seeding and landscaping of the site. At a beach or other public facility, users may have left trash, broken glass, or cans, or driftwood or other washed-up debris may make the area both unsightly and unsafe.

Of course, one solution is to pick up such trash and debris by hand. However, this process is not only tedious, but time consuming. When large areas such as beaches, fields or construction sites are to be cleared, the number of people necessary to quickly clear the area may be quite large, and the number of available workers may be insufficient on an interim basis. In addition, in the case of beaches, the task may need to be continuously repeated, making such labor costs prohibitive. Finally, some stones, glass, or other debris may be located just below the surface of the soil, preventing detection by the human eye.

Accordingly, a number of different machines have been developed which have, as a goal, the separation of the soil from the debris and windrowing of the latter. Windrowing is an attractive approach because the stones, trash and other debris may be located in a single line of travel and then collected by hand or by a rock picker or other machine. Examples of this type of machinery are shown, for example in U.S. Pat. No. 2,938,586, 2,971,587, 3,117,631, 3,739,855, 3,923,101, 3,993,141, 4,315,546, 4,440,235, 4,496,003, and 4,555,897.

However, a principal disadvantage of the presently available rock windrowing machines lies in the inability to selectively pivot the roller used to dislodge and advance the rocks and debris from side to side about a center pivot axis. This deficiency prevents the windrow from being moved across the field in successive passes, so that only a single windrow need be ultimately disposed of. In addition, the machines of the prior art do not provide for a rugged and durable barrier adjacent the roller which engages the rocks so that the size of the material permitted to pass therethrough may be controlled. Finally, the manner in which the roller was mounted to the implement often inhibited the windrowing of larger debris.

SUMMARY OF THE INVENTION

These and other problems are largely solved by the powered rake windrowing apparatus of the present invention. That is to say, the present invention provides a windrowing apparatus which includes a powered roller which is mounted for selectively and adjustably pivoting to an obliquely angled orientation to either the right or the left with respect to the direction of travel. The powered rake hereof also includes a blade which not only serves to help discriminate the size of the material to be windrowed, but also aids in scraping mud which adheres to the outer surface of the powered roller and limits the number of moving parts associated with the apparatus compared to prior art devices. The powered roller is presented to the rocks and other debris with largely open areas forwardly and outboard thereof, thereby permitting large debris to move freely outboard to the windrow. The roller includes a plurality of circumferentially spaced splines to dislodge rocks and debris, the splines preferably being slightly spiraled or helically wound around the surface of the roller to allow smooth operation of the power rake and to smoothly and evenly work the soil. The powered rake windrowing apparatus hereof also preferably includes a plurality of rock engaging tines disposed forwardly of the powered roller, the tines being adjustably mounted relative thereto to allow the operator to adjust the depth of penetration of the tines during windrowing.

The powered rake windrowing apparatus hereof broadly includes a frame adapted for coupling to and preferably towing behind a tractor, a powered roller provided with a plurality of circumferentially disposed splines for engaging the soil, power transfer means adapted to receive a source of power from the tractor and transfer it to the roller, and means mounting the roller to the frame for enabling the roller to pivot to an oblique angle to the right or the left relative to the intended direction of travel. Preferably, a shifting member such as an extensible and retractable hydraulic cylinder is provided for interconnecting the frame and the subframe which carries the roller to selectively shift the roller either right or left relative to the direction of travel.

A material control member is mounted proximally to and preferably above the roller, so that debris dislodged during forward movement of the roller is deterred from moving rearwardly and only soil and other smaller sized particulate material is permitted to pass rearwardly between the member and the roller. The material control member is preferably a blade which, while without any moving parts, is adjustably mounted relative to the powered roller so that the gap therebetween, as well as the orientation of the blade relative to the roller, can be adjusted to screen out debris as desired. In addition, the blade serves to scrape mud and the like which adheres to the powered roller under certain conditions.

Advantageously, the frame includes a pair of downwardly and forwardly angled legs which carry the powered roller and the chain drive therefore. The legs are configured and the powered roller mounted thereto so that the forwardmost portion of the roller has no frame portion or other obstacle outboard thereof, thus permitting the rocks and other debris to pass freely off the splines of the roller to the windrow. This is to be distinguished from prior art rock windrowers where the arms were rearwardly and downwardly oriented, presenting an obstacle when large roots, rocks and the like were to be windrowed.

Power is preferably supplied to the powered windrowing apparatus hereof by a telescoping shaft connected to the power take-off (PTO) of the tractor. A pivot joint, preferably of a double yoke construction to provide constant velocity without binding during pivoting is positioned immediately above and centered on the pivot axis of the powered rake to provide a minimum of movement thereof whether the powered rake is angled right or left. In addition, a friction clutch is located in the drivetrain to minimize any damage due to shock should the powered roller become jammed and stop abruptly. A gearbox connects the PTO driven shaft, pivot joint and clutch to the chain and sprocket drive for the powered roller via a directly driven shaft to limit power loss usually attributable to additional joints and telescoping linkages.

In especially preferred embodiments, the gauge wheels support the frame for the roller at a desired depth, and can be reversed to change the distance between the gauge wheels and the roller. For example, the gauge wheel can be positioned more closely to the roller to allow it to follow the terrain more closely, or reversed to provide a greater distance to the powered roller whereby the roller has a smoothing effect and tends to level the soil. Another preferred aspect of the present invention includes the use of soil engaging tools such as tines ahead of the roller to dislodge dug-in debris and stones. A double acting hydraulic cylinder is provided to selectively and adjustably raise and lower the tines to provide the desired depth of penetration and soil loosening ahead of the roller.

DESCRIPTION OF THE PREFERRED EMBODIMENT

Figure 1:
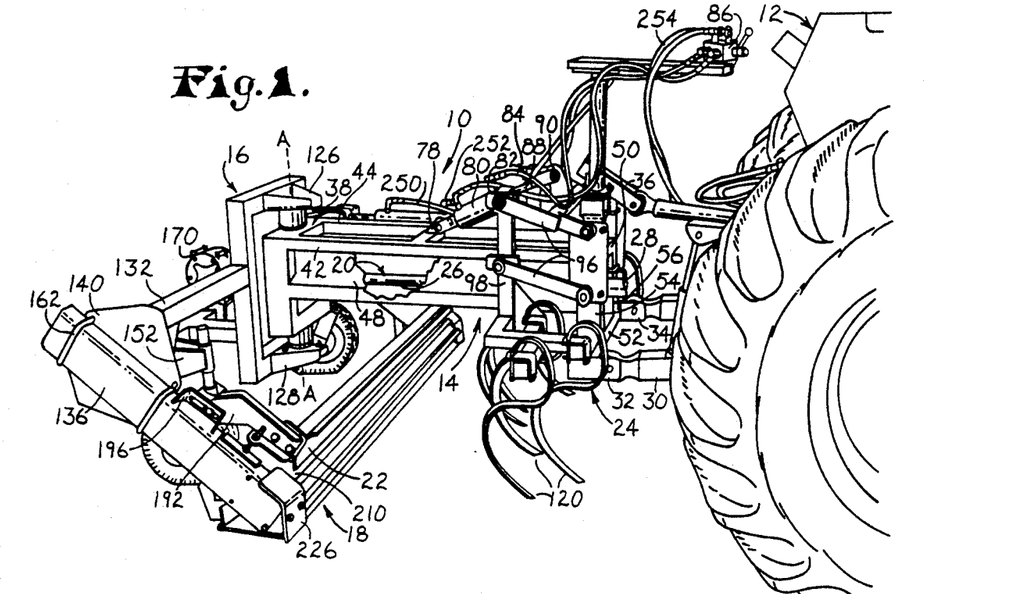
FIG. 1 is a left front perspective view of the powered rake for windrowing debris in accordance with the present invention shown coupled to a tractor, with a portion of the PTO-driven shaft broken away for clarity.
Figure 2:
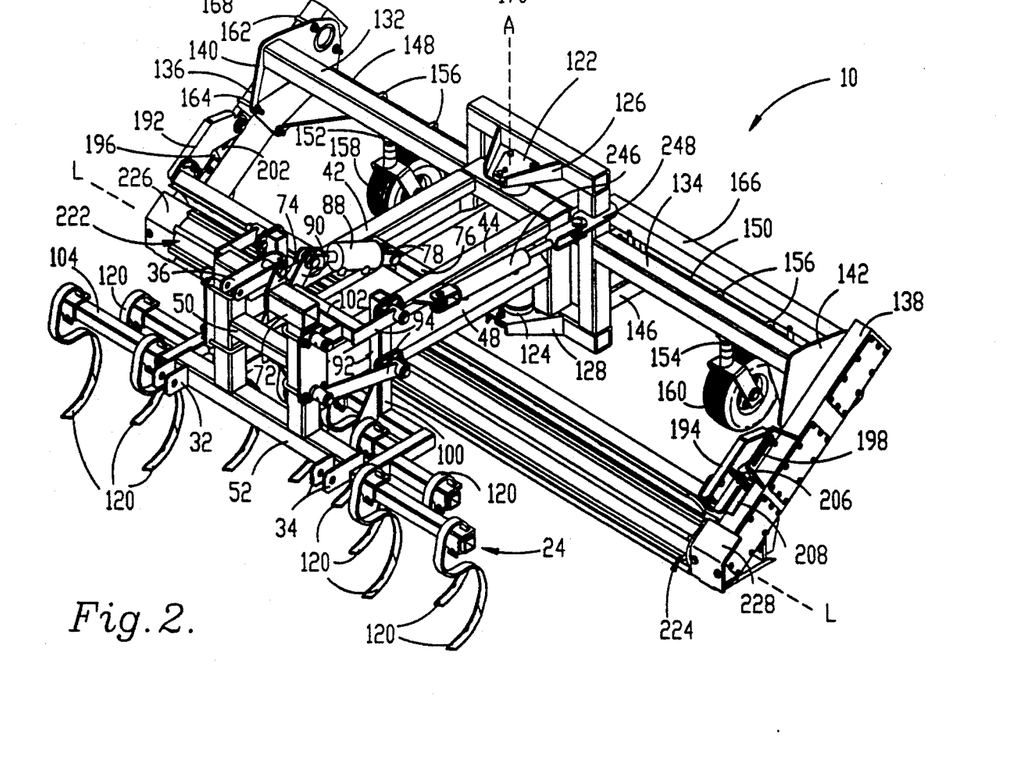
FIG. 2 is a right front perspective view of the present invention with the PTO-driven shaft broken away for clarity.

Referring now to the drawing, a powered rake 10 for windrowing debris is adapted to be towed behind a tractor 12 is shown in FIG. 1 and broadly includes a main frame 14, a roller support subframe 16 pivotally mounted thereto a powered roller 18, a drivetrain 20 for powering the roller 18, a material control member 22 and a tine unit 24. The drivetrain 20 includes a driveshaft 26 which is splined so that a powershaft 28 (shown in FIG. 3) which is internally splined at each end can transfer power from the power take-off unit (PTO) of the tractor 12. The main frame 14 is attached to the links of a 3-point hitch 30 of the tractor by hitch lugs 32 and 34 and upper floating hitch 36.

In greater detail, main frame 14 includes a rearwardly extending chassis 38 comprised of two tubular beams 42 and 44 which a re visible in FIG. 1, and an integral support member 48 which also serves to cover driveshaft 26 located therewithin. An upper crosspiece 50 and a lower crosspiece 52 are located at the forward end of chassis 38, and the crosspieces 50 and 52, together with uprights 54 and 56, serve to interconnect the tubular beams at the forward end of the chassis 38. Hitch lugs 32 and 34 are attached by welding or the like to lower crosspiece 52.

Figure 6:
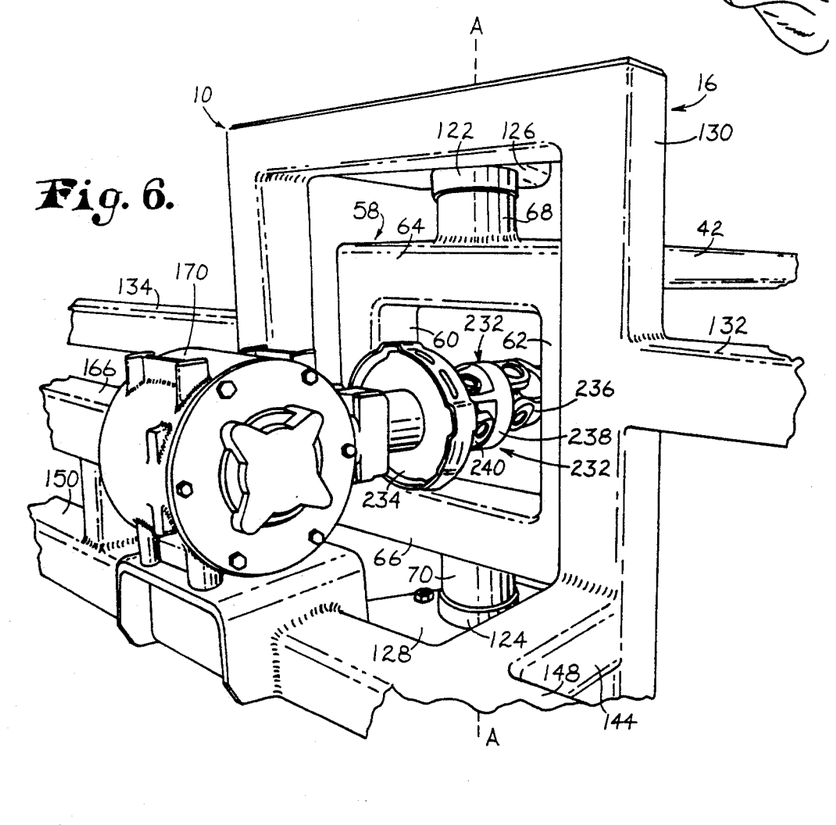
FIG. 6 is an enlarged, fragmentary rear perspective view showing the pivotal connection between the main frame and the powered rake subframe.

Turning now to FIG. 6, the rear end of the chassis 38 includes a pivot support box 58 which is preferably welded to the tubular beams (as are the crosspieces 50 and 52 and the uprights 54 and 56). Pivot support box includes towers 60 and 62 and crossbraces 64 and 66 preferably welded into an integral unit. Upper pivot post 68 extends upwardly from crossbrace 64 while lower pivot post 70, which is co-axial with upper pivot post 68, depends from crossbrace 66.

An attachment brace 72 is attached to the uppermost portions of uprights 54 and 56 to mount hitch bracket 74 which pivotally mounts upper floating hitch 36 for attachment to the top link of a 3-point hitch of the tractor 12. Additionally, a midsection brace 76 connects tubular beams 42 and 44 and carries an ear 78 for pivotally mounting tine adjustment cylinder 80 thereto. Tine adjustment cylinder 80 is a double acting hydraulic cylinder fluidically connected by conduits 82 and 84 with control box 86 so that the operator can extend or retract stem 88 of tine adjustment cylinder 80 which is pivotally connected to crank arm 90.

Tine unit 24 includes tine subframe 92 pivotally connected to main frame 14 by parallel linkages 94 and 96. The tine subframe 92 includes posts 98 and 100 pivotally connected to the respective parallel linkages 94 and 96, the upper link of each preferably welded to bight 102 which carries crank arm 90. Tine subframe also includes tine support beams 104, 106, 108, 110, 112, 114, 116 and 118 which effectively present three tiers of danish tines 120 mounted at selectively spaced locations therealong. By virtue of the parallel linkages 94 and 96, extension or retraction of the stem 88 serves to raise or lower the tine subframe 92 while the tines 120 are maintained in substantially the same horizontal plane relative to one another.

Roller support subframe 16 is mounted for pivotal movement about a vertical pivot axis A extending through the center of pivot posts 68 and 70 by pivot bushings 122 and 124 bolted to upper pivot mounting 126 and lower pivot mounting 128, respectively. Pivot mountings 126 and 128 are in turn welded to pivot tower 130 of pivot support subframe 16. Roller support arms 132 and 134 extend generally laterally from pivot tower 130 in opposite directions for attachment to plates 140 and 142 respectively secured to roller support legs 136 and 138. In addition, shoulders 144 and 146 extend rearwardly from pivot tower 130 for attaching laterally extending lower support elements 148 and 150 thereto. Lower support elements 148 and 150 are in turn welded to plates 140 and 142 respectively below and rearwardly of support arms 132 and 134. Lower support elements reversibly mount gauge wheel mounts 152 and 154 thereon by U-bolts 156 extending around the lower support elements 148 and 150 and through the gauge wheel mounts 152 and 154. The gauge wheels 158 and 160 thus may be positioned alternately either forwardly or rearwardly of the lower support elements 148 and 150.

Roller support leg 136 is not coupled to the drivetrain 20 and thus supplies no power to the roller 18. Roller support leg 136 is adjustable relative to plate 140 by virtue of U-clamps 162 and 164 extending around the roller support leg 136 in clamping relationship. U-clamps 162 and 164 can be loosened so that roller support leg 136 can be moved along a downwardly and forwardly inclined path to level the roller 18 along its longitudinal axis left-to-right with respect to the intended direction of travel. Suitable bearings and the like are provided at the lowermost end of support leg 136 to rotatably mount the roller 18 as will be appreciated by those skilled in the art.

Figure 3:
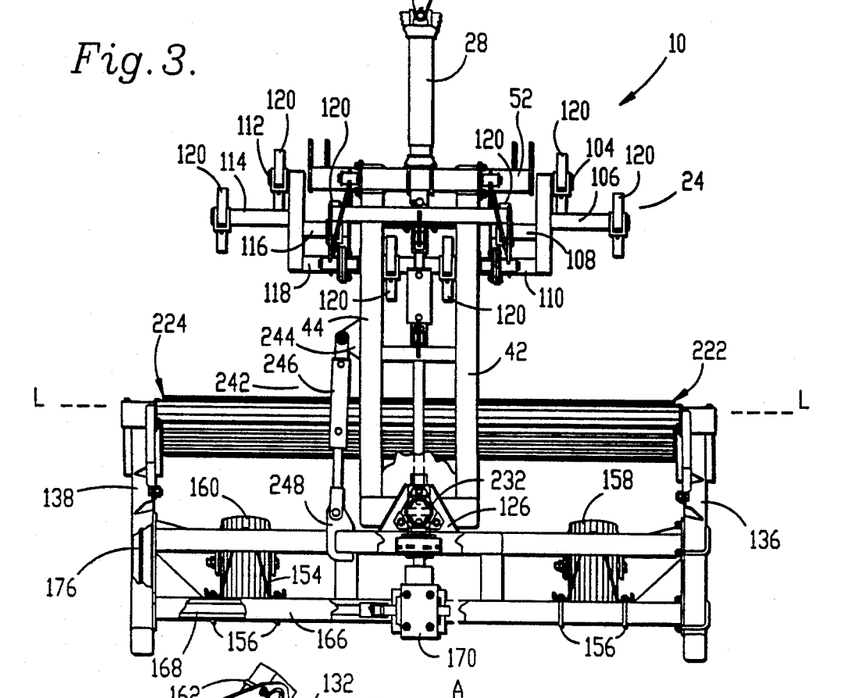
FIG. 3 is a top plan view of the present invention with the powered rake in a centered position and with portions of the channel covering the shaft driven by the gearbox and the housing covering the shaft leading to the constant velocity joint broken away.

Layshaft 168 is located within shaft guard channel 166 as shown in FIG. 3, and operatively connects gearbox 170 with chain drive 172 within roller support leg 138.

Figures 7, 8, 9, 10:
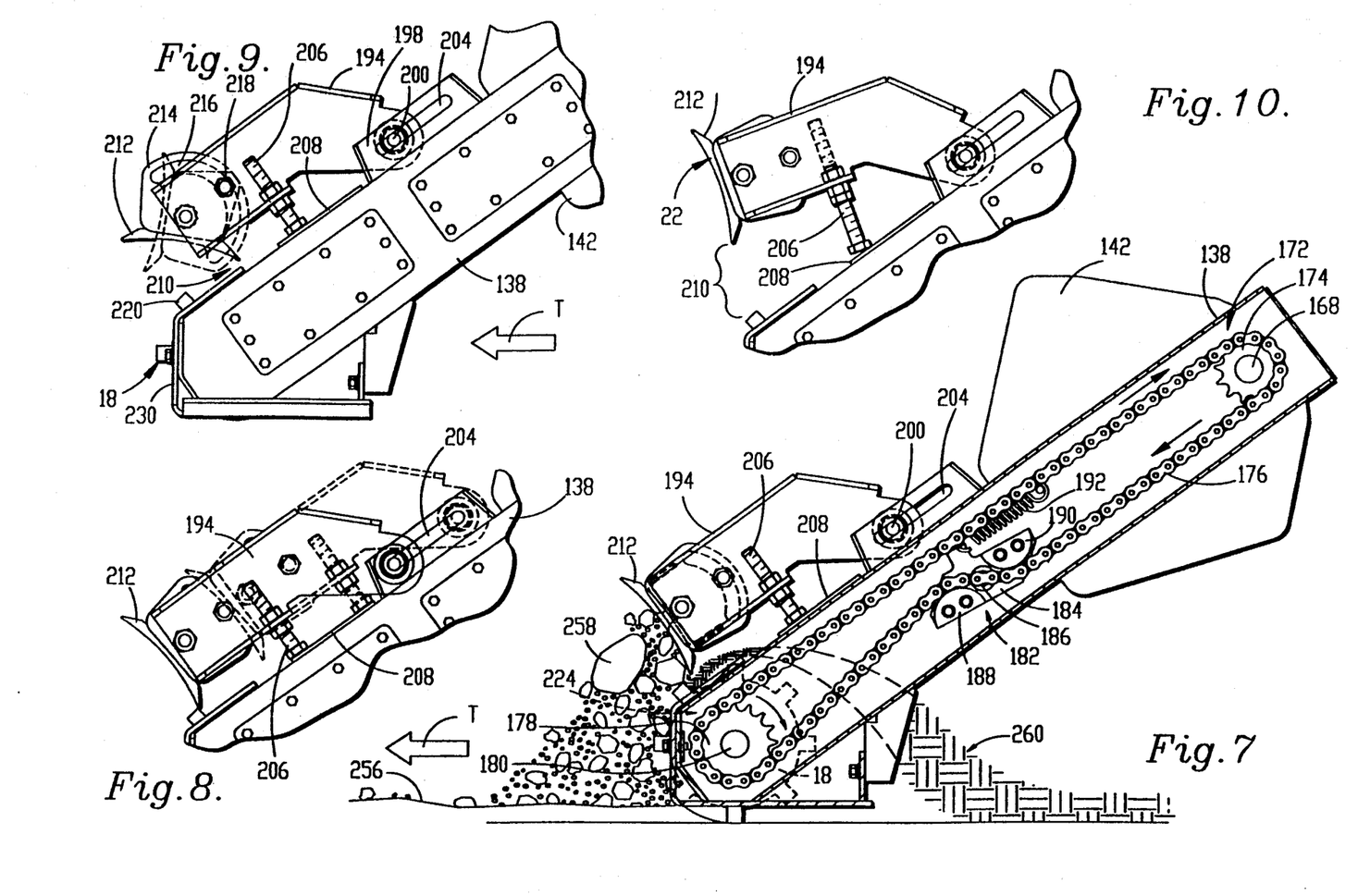
FIG. 7 is an enlarged, fragmentary right side elevational view of the powered roller and material control blade showing the soil passing therebetween while the larger debris is windrowed.
FIG. 8 is an enlarged, fragmentary right side elevational view of the material control blade shown proximate the powered roller and, in phantom, shifted rearwardly along the roller support leg.
FIG. 9 is an enlarged, fragmentary right side elevational view of the material control blade showing its range of tilting adjustment relative to the powered roller.
FIG. 10 is an enlarged, fragmentary right side elevational view of the material control blade showing the blade mounting arm elevating the blade away from the powered roller.
Figure 11:
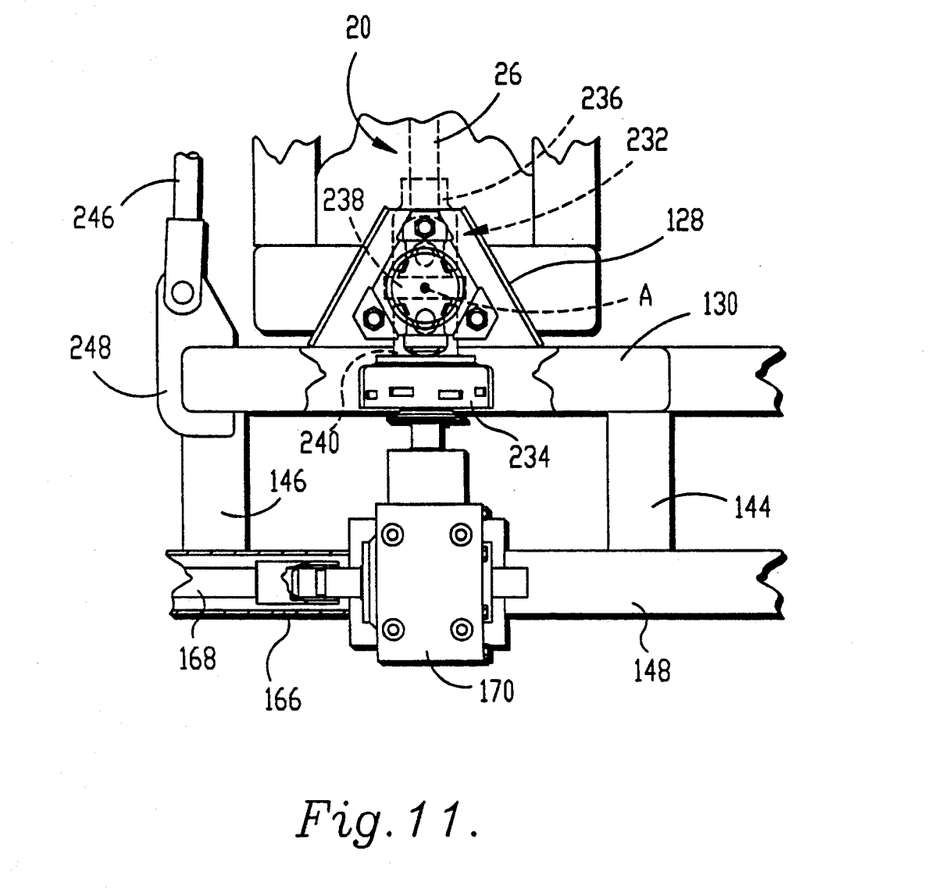
FIG. 11 is an enlarged, fragmentary top plan view present invention showing the friction clutch and gearbox of the drivetrain, with the double universal joint assembly shown in phantom over the pivotal connection between the main frame and the roller subframe.

Turning now to FIG. 7, chain drive 172 is internally housed within roller support leg 138 for powering roller 18. Chain drive 172 includes drive sprocket 174 driven by layshaft 168, chain 176, drive sprocket 178 secured to axle 180 of roller 18, and chain tensioner assembly 182. Chain tensioner assembly 182 includes a tensioner mounting bracket 184 which is mounted on pin 186 for pivoting relative to roller support leg 138. Chain 176 rubs across tensioner blocks 188 and 190 which are made of ultra-high molecular weight polyethylene for providing a durable and friction-resistant tensioner. Spring 192 biases tensioner mounting bracket 184 so that tensioner blocks 188 and 190 are in engagement with the chain 176. The direction of movement of the chain is illustrated by the arrows adjacent thereto, and consequently the roller 18 is powered to move in a clockwise direction as viewed in FIG. 7.

Material control member 22 is pivotally mounted above the roller support leg 138 and extends across the width of roller 18 to define a gap 210 therebetween. Pivot arms 192 and 194 are respectively pivotally mounted to adjustment brackets 196 and 198 by bolts 200. By loosening bolts 200, the pivot arms may be moved forwardly and rearwardly along slots 202, 204 as shown in FIG. 8. Further, the pivot arms 192 and 194 may be pivoted up and down until adjustment bolts 206 engage lands 208 on the respective roller support legs, as demonstrated in FIG. 10.

In addition, material control member 22, which is preferably in the form of an elongated blade 212 which though adjustable remains stationary relative to the subframe 16 during use, may be tilted relative to roller 18 as shown in FIG. 9. Blade 212 preferably presents a front surface which is slightly curved and is carried by brackets 214 located at each end thereof, brackets 214 presenting an angular slot 216 so that adjustment bolt 218 may be loosened and blade 212 pivoted until the desired angular orientation is achieved.

Roller 18 is in the form of an elongated cylinder presenting a plurality of circumferentially spaced, radially projecting, axially extending splines 220. The single roller of the present invention is rotatable about its longitudinal axis L which extends generally transversely at an oblique angle relative to the intended direction of travel T. The roller 18 presents two ends 222 and 224 which lie adjacent skid shoes 226 and 228 mounted at the lowermost and forwardmost ends of the roller support legs 136 and 138. As may be seen from FIGS. 7 and 9, the splines 220 which are oriented forwardly extend forward beyond the front margin 230 of the skid shoes 226, 228, thereby presenting an open area immediately forward and outboard of the roller 18 on either side thereof. This enables rocks, boards and other large debris to windrow unimpeded by any structural member associated with the powered rake 10.

Drivetrain 20 for supplying power to the roller 18 includes driveshaft 26 which is connected to gearbox 170 via a double universal pivot joint 232 and a friction slip clutch 234. Gearbox 170 is of conventional design, and an exemplary unit useful in connection with the present invention is Model # 244.243 made by Comer, Inc., of Charlotte, North Carolina. Similarly, double universal pivot joint 232, which includes a forward yoke 236, double yoke 238 and rear yoke 240 connected by cross and bearing units, can be purchased as a unit with slip clutch 234 as model number DG2300-K92 041620/311105 made by Walterscheid, Inc., of Burr Ridge, IL. Pivot joint 232 is preferably located so that the double yoke, at the center of the joint, is intermediate pivot mountings 126 and 128 and aligned with pivot axis A.

Shifting element 242 allows the operator to selectively angle the subframe 16 and the roller 18 to the right or left relative to the intended direction of travel T. Flange 244 extends outwardly of tubular beam 44 on main frame 14 for pivotally mounting extensible double-acting hydraulic shift cylinder 246 thereto. The opposite end of cylinder 246 is pivotally coupled to shackle 248 which in turn is secured to subframe 16. Hydraulic hoses 250 and 252 supply hydraulic fluid under pressure to cylinder 246 to extend or retract the cylinder 246, and the amount of pressurized fluid supplied to the hoses by a hydraulic pump on the tractor 12 is regulated by the operator's use of control box 86 to which the hoses 250 and 252 are fluidically coupled.

Figures 12, 13, 14, 15:
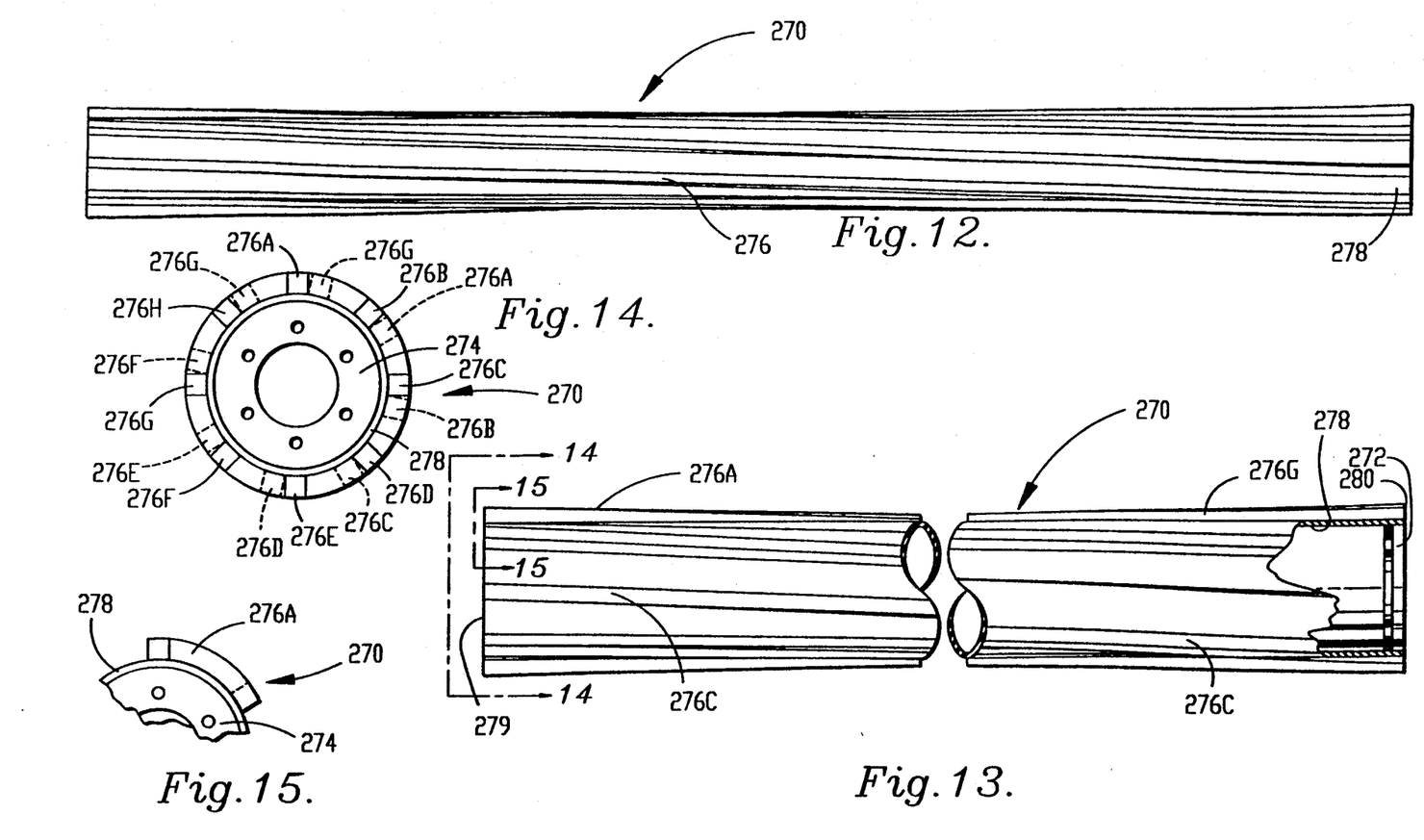
FIG. 12 is an enlarged, front elevational view of an alternate embodiment of the roller for use with the powered rake hereof.
FIG. 13 is an enlarged, fragmentary front elevational view of the alternate roller shown in FIG. 12 with the center portion foreshortened and a portion of the surface, thereof broken away.
FIG. 14 is a left end elevational view taken along line 14—14 of FIG. 13 showing the alternate embodiment of the roller with the corresponding opposite end of the spirally oriented splines shown in phantom.
FIG. 15 is an enlarged fragmentary end view taken along line 15—15 of FIG. 13 showing the spiral progression of a single spline of the alternate embodiment roller hereof.

In an alternate embodiment of the powered rake 10 hereof, spirally splined roller 270 is substituted for roller 18. The roller 270 is tubular and circular in cross section as shown in FIG. 13, and mounts end plates 272 and 274 as shown in FIGS. 13 and 14. The end plates serve to mount a shaft serving as an axle 180 thereon. The roller 270 carries a plurality of circumferentially spaced, radially projecting splines 276 which extend generally along the longitudinal axis thereof and are spirally oriented to progress circumferentially around the outer surface of the tubular portion 278. Each spline is preferably substantially continuous and extends across the width of the roller 270 between a first end 279 and a second end 280. The splines 276 are thus oriented to provide a continuous, rather than intermittent, engagement with the surface of the soil without the spiralling being so aggressive that the rotation of the roller causes the rocks, soil and other debris to auger in a lateral direction along the axis L. The spiral progression of the splines 276 thus permits an even load to be applied to the roller 270 during its rotation when engaged with the soil. As may be seen in FIGS. 12, 13, 14, and 15 each of the eight splines 276A, 276B, 276C, 276D, 276E, 276F, 276G and 276H spirals through an arc of less than 180° but something more than 45° and preferably about 57° across the width of the roller 270 to provide some continuous contact with the soil by the roller 270 when the latter is rotating and positioned in a soil-engaging orientation. The amount of arcuate progression of the spiral across the width is preferably just slightly more than 360° divided by the number of splines to ensure full and continuous contact with the soil without an adverse or noticeable auguring effect.

Operation

Prior to operating the powered rake 10, the operator connects the powershaft 28 to the tractor 12 PTO and the driveshaft 26, as well as connecting the hitch lugs 32 and 34 and the upper floating hitch 36 to the 3-point hitch 30 on the tractor 12. Hydraulic fluid supply and return hoses 254 are connected to the control box 86. The operator determines the depth of engagement of the rollers 18 or 270 by adjusting the gauge wheel mounts 152 and 154 as desired. In addition, the operator may leave the gauge wheel mounts in the position shown in the drawing to place the gauge wheels 158 and 160 closer to the rollers 18 or 270 for more precise depth control, or reverse the gauge wheel mounts to place the gauge wheels behind a vertical plane through the lower support elements 148 and 150 to obtain greater leveling of the soil 256 on which the powered rake 10 is to operate. By soil, it is to be understood that the rake hereof may be operated on silt, sand, clay or other outdoor surface which can be penetrated and sifted, but that such would not include, for instance, hard surfaces such as artificial turf, streets or the like.

Figures 4, 5:
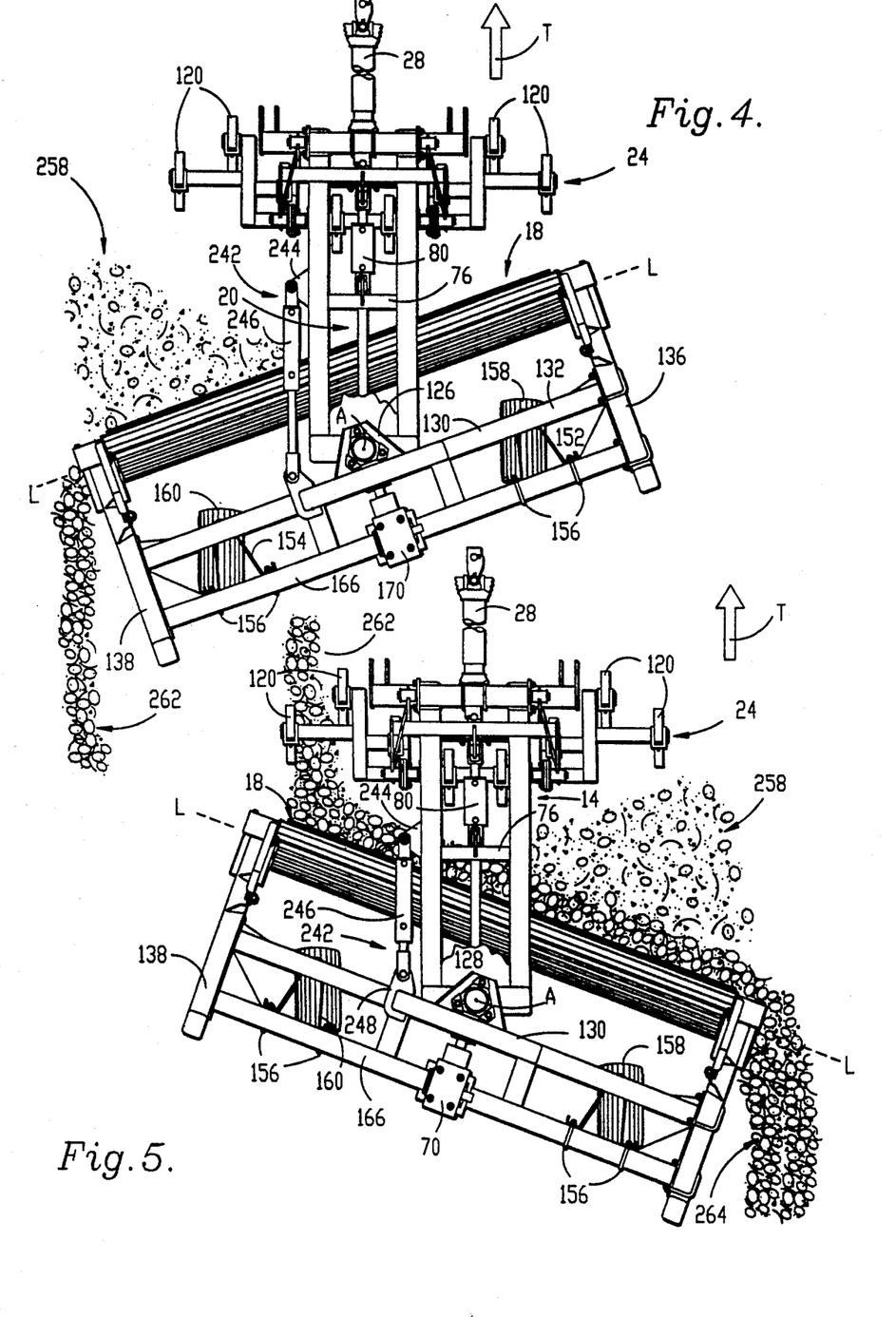
FIG. 4 is a top plan view similar to FIG. 3 with the constant velocity joint and portions of the drive shaft removed and the powered rake angled toward the left to deposit a windrow to the left with respect to the direction of travel.
FIG. 5 is a top plan view similar to FIG. 4 with the powered rake angled toward the left to deposit a windrow to the left with respect to the direction of travel.

The operator also preferably ensures that the rollers 18 or 270 are level if supported on a level soil surface. This may be accomplished by ensuring that the air pressure is equal in both gauge wheels 158 and 160 and that they are set at the same height. U-clamps 162 and 164 may be loosened and the support leg 136 moved relative to the plate 140 until the left end 222 is level with the right end 224 of the roller. Finally, the operator actuates shift cylinder 246 to obliquely angle the roller to the left to produce a left windrow of debris, as shown in FIG. 4, or to the right to produce a windrow of debris to the right, as shown in FIG. 5.

To transport the powered rake 10, the operator raises the 3-point hitch 30 on the tractor 12 to lift the entire powered rake off the ground. When in position, the 3-point hitch 30 is lowered and the rollers 18 or 270 engages the surface of the soil, as illustrated in FIG. 7. To aid in lifting rocks, trash and other debris, the operator may lower the tines 120 to the desired depth of penetration by extending or retracting tine adjustment cylinder 80, which allows crank arm 90 to raise or lower and thus permit tine unit 24 to elevate or lower on parallel linkages 94 and 96.

The drivetrain 20 serves to rotate the roller 18 or 270 in a direction against the intended direction of travel. That is to say, the roller does not merely roll over the soil 256 but counter-rotates against the soil 256 to lift rocks 258 and other debris engaged by the front surface of the roller 18 or 270, and particularly the splines 220 or 276. The soil 256, including rocks 258 and other debris, is thus agitated and lifted. The smaller rocks and particles of soil are able to pass through the gap 210 between the material control member 22 and the roller 18 or 270, while larger rocks and debris are prevented from passing therethrough and therefore ride rearwardly and outboard along the roller according to the angle of the roller. As noted earlier, the material control member 22 is preferably a blade 212 presenting no moving parts and is biased downwardly toward the roller 18 or 270 only by gravity. As such, it is rugged and durable, and able to withstand considerable pounding by rocks and other debris. If a rock should become wedged between the blade 212 and the roller 18 or 270, it is free to ride up by the pivotal action of pivot arms 192 and 194 to avoid damage either to the blade 212 or to the roller 18 or 270. As a result, processed soil 260 substantially free of debris accumulates behind the roller 18 or 270 while the rocks and other debris are windrowed to the side. In the case of roller 270, the limited spiral at the splines along the roller does not cause noticeable lateral movement of the debris and thus does not impede the bi-directional windrowing feature. According to the size of debris to be permitted to pass through, the type of soil, and the speed at which the powered rake 10 is to be towed, the material control blade 22 may be shifted fore and aft along slots 202 and 204, raised by bolts 206, or tilted at an angle along angular slot 216, as illustrated in FIGS. 7, 8, 9 and 10.

Conveniently, when the operator finishes a first pass through the field and accumulates a windrow, the angle of the subframe 16 and roller 18 or 270 can be reversed so that the windrow just made can be moved in the same direction and accumulated in several passes. As shown in FIGS. 4 and 5, a first windrow 262 can be generated and in a second pass the first windrow 262 can be moved across the roller 18 or 270 into an accumulated second windrow 264. The operator need merely actuate the control box 86 to extend or retract the shift cylinder 246 and the subframe 16 thus pivots about pivot axis A relative to the main frame 14. This is especially convenient in circumstances such as a residential lot to be cleaned of debris after construction, where the operator may make a first pass adjacent a house to windrow the debris away from the house, and in successive passes move the windrow to the street for cleanup in a single pass by a rock picker, front end loader, or manually. The operator can also change the depth of penetration of the tines 120 simply by actuating the control box 86 to extend or retract stem 88 of cylinder 80.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the liberal scope of the invention as set out in the following claims:

1. In a powered rake having a debris windrowing mechanism, the improvement comprising:
   a main frame adapted for connection to a tractor;
   a roller presenting a longitudinal axis;
   a subframe pivotally mounted to said main frame about an upright pivot axis, said roller being rotatably mounted to said subframe;
   means coupled with the subframe for selectively orienting said roller at an oblique angle relative to its intended direction of travel; and
   powering means for rotating said roller to lift debris engaged by said roller, said powering means including a driveshaft presenting a pivot joint substantially vertically aligned with said pivot axis.

2. A powered rake as claimed in claim 1, said orienting means comprising an extensible member pivotally connected to at least one of said frame and subframe.

3. A powered rake as claimed in claim 2, said extensible member comprising a double acting hydraulic cylinder mounted to said frame and said subframe for selectively shifting the orientation of said roller between a left oblique angle relative to the direction of travel to a right oblique angle relative to the direction of travel.

4. A powered rake as claimed in claim 1, said pivot joint including a plurality of yokes.

5. A powered rake as claimed in claim 1 including at least on tine located forwardly of the roller for penetrating and engaging the soil.

6. A powered rake as claimed in claim 5 including a plurality of tines, wherein said tines are collectively mounted to a subframe, and including means for selectively vertically shifting said subframe for adjustably varying the depth of penetration of said tines into the soil.

7. A powered rake as claimed in claim 1 including a gauge wheel and means for mounting said gauge wheel alternately more proximate or more distal to said roller.

8. A powered rake as claimed in claim 1, including means for coupling said powering means to a power take-off drive unit of a tractor.

9. A powered rake as claimed in claim 1, wherein said main frame includes means for attachment to a 3-point hitch of a tractor, said main frame, said subframe, said roller, said selective orienting means and said powering means being interconnected whereby said powered rake may be lifted free of the soil by elevating said 3-point hitch.

10. A powered rake as claimed in claim 1, including a material control member attached to said subframe, said material control member being substantially stationary relative to said subframe during windrowing of said debris.

11. A powered rake as claimed in claim 1, wherein said roller mounts a plurality of circumferentially spaced, radially projecting splines thereon spiralling about said longitudinal axis.

12. In a powered rake having a debris windrowing mechanism, the improvement comprising:
    a frame adapted for coupling to a tractor;
    a roller presenting a longitudinal axis, said roller being operably connected to said frame for engagement with the soil over which the roller travels;
    powering means for rotating said roller about its longitudinal axis to lift debris engaged by said roller; ;and
    a material control member mounted in stationary relationship to said frame and presenting a width extending along said member in substantially parallel orientation to said longitudinal axis, said roller and said member defining a gap therebetween for allowing the passage of soil therethrough and for restricting the passage of debris therethrough.

13. The powered rake as claimed in claim 12, including a subframe coupled to said main frame, and structure adjustably mounting said material control member to said subframe.

14. The powered rake as claimed in claim 13, said adjustable mounting structure including means for raising and lowering said material control member.

15. The powered rake as claimed in claim 13, said adjustable mounting structure including means for shifting said material control member forwardly and rearwardly.

16. The powered rake as claimed in claim 13, said adjustable mounting structure including means for tilting said material control member relative to said roller.

17. The powered rake as claimed in claim 12, said material control member comprising a blade positioned above said roller.

18. A powered rake as claimed in claim 12, wherein said roller has a plurality of circumferentially spaced, radially projecting, splines thereon spiralling about said longitudinal axis.

19. In a powered rake having a debris windrowing mechanism, the improvement comprising:
    a frame adapted for connection to a tractor for a movement in an intended direction of travel;
    a roller presenting a pair of ends and a longitudinal axis; said roller being operably connected to said frame for engagement with the soil over which the roller travels;
    positioning means for locating said roller beneath the frame in engagement with soil carrying the debris to the windrowed, said positioning means including a pair of downwardly and forwardly extending legs positioned adjacent the respective ends of said roller for supporting the latter without interfering with the debris discharged laterally by the roller as the rake is advanced; and powering means for rotating said roller about its longitudinal axis to lift debris located on said supporting surface engaged by said roller.

20. A powered rake having a debris windrowing mechanism as claimed in claim 19, wherein at least one of said arms being configured to present a substantially open area forward of and outboard of the roller for the passage of debris in a longitudinal direction along the roller to a position outboard of said one arm.

21. A powered rake having a debris windrowing mechanism as claimed in claim 19, at least one of said legs carrying at least a portion of said powering means.

22. A powered rake having a debris windrowing mechanism as claimed in claim 19, including means for selectively shifting said legs to obliquely angle said roller relative to the intended direction of travel of said rake.

23. A powered rake as claimed in claim 19, wherein said roller mounts a plurality of circumferentially spaced, radially projecting splines thereon spiraling about said longitudinal axis.

24. In a powered rake having a frame for connection to a tractor for movement in an intended direction of travel, a roller presenting a longitudinal axis mounted to said frame in soil-engaging relationship, and means for rotating the roller to engage the soil during movement of said rake in said intended direction of travel, the improvement comprising:

a plurality of circumferentially spaced, radially projecting splines mounted on said roller in spirally progressing orientation about said longitudinal axis.

25. A powered rake as set forth in claim 24, wherein said roller presents a width and said splines spirally advance through an arc of less than 180° across the width of said roller.

* * * * *